United States Patent [19]

Ikura

[11] Patent Number: 4,915,162
[45] Date of Patent: Apr. 10, 1990

[54] METHOD AND APPARATUS FOR HEATER CURRENT CONTROL FOR AUTOMATIC VENDING MACHINE

[75] Inventor: Yasuhiro Ikura, Isesaki, Japan

[73] Assignee: Sanden Corporation, Gunma, Japan

[21] Appl. No.: 393,098

[22] Filed: Aug. 3, 1989

Related U.S. Application Data

[63] Continuation of Ser. No. 905,400, Sep. 10, 1986, abandoned.

[30] Foreign Application Priority Data

Sep. 10, 1985 [JP] Japan .................. 60-198595

[51] Int. Cl.$^4$ .................. F25B 29/00; H02J 1/00; H02J 3/00; H02J 3/14
[52] U.S. Cl. .................. 165/2; 165/14; 165/58; 165/918; 307/34; 307/35; 307/38; 307/39; 312/236; 222/146.1
[58] Field of Search .................. 62/230; 219/485, 508; 307/31, 32, 33, 34, 35, 38, 39, 40, 41; 222/146.1, 146.5, 146.6; 165/58, 63, 64, 918, 2

[56] References Cited

U.S. PATENT DOCUMENTS

| | | | |
|---|---|---|---|
| 1,194,165 | 8/1916 | Fry | 307/34 |
| 2,843,759 | 7/1958 | Roots | 307/34 |
| 3,005,109 | 10/1961 | Funkhouser et al. | 307/34 |
| 3,422,633 | 1/1969 | Bodett | 62/230 X |
| 3,577,741 | 5/1971 | Shaw | 62/230 X |
| 3,599,006 | 10/1971 | Harris | 307/39 |
| 3,901,308 | 8/1975 | Berger | 62/230 X |
| 4,068,781 | 1/1978 | Toth | 219/485 X |
| 4,160,153 | 7/1979 | Melander | 307/39 |
| 4,198,553 | 4/1980 | Dills | 307/41 |
| 4,307,775 | 12/1981 | Saunders et al. | 219/485 X |
| 4,419,589 | 12/1983 | Ross | 307/34 |
| 4,499,385 | 2/1985 | Slavik | 307/35 |
| 4,517,812 | 5/1985 | Umezn | 62/230 X |
| 4,564,733 | 1/1986 | Karklys | 307/41 |
| 4,663,948 | 5/1987 | Rummel | 307/38 |
| 4,687,948 | 8/1987 | Helt | 307/38 |

FOREIGN PATENT DOCUMENTS

| | | | |
|---|---|---|---|
| 2246100 | 4/1975 | France | 307/35 |
| 52-80099 | 7/1977 | Japan . | |
| 0004449 | 1/1979 | Japan | 307/34 |
| 0058841 | 5/1979 | Japan | 307/38 |
| 55-8056 | 2/1980 | Japan . | |
| 57-147718 | 9/1982 | Japan | 219/485 |
| 59-23169 | 12/1984 | Japan . | |
| 0767895 | 9/1980 | U.S.S.R. | 307/35 |
| 197806 | 6/1978 | United Kingdom | 307/38 |
| 2019138 | 10/1979 | United Kingdom | 307/35 |

*Primary Examiner*—John Ford
*Attorney, Agent, or Firm*—Banner, Birch, McKie & Beckett

[57] ABSTRACT

In an automatic vending machine having a heater for boiling water, and a motor-driven compressor for refrigeration, a flow of current to the heater is stopped when the compressor is started. On the other hand, while the compressor is being operated stably, the current flowing in the heater is controlled in phase such that the sum of an effective current flowing in the compressor and an effective current flowing in the heater does not exceed a predetermined value.

2 Claims, 2 Drawing Sheets

METHOD AND APPARATUS FOR HEATER CURRENT CONTROL FOR AUTOMATIC VENDING MACHINE

This application is a continuation, of application Ser. No. 06/905,400, filed Sept. 10, 1986, now abandoned.

FIELD OF THE INVENTION

The present invention relates to a method of controlling the heater current of an automatic vending machine.

Generally, automatic vending machines, for example, coffee vending machines, which have a heater for boiling water and a motor-driven compressor for refrigeration, have a common problem in that when the heater and the compressor are energized at the same time, the total current exceeds a maximum desirable current.

BACKGROUND OF THE INVENTION

To resolve this problem, various methods have been proposed by the prior art.

Japanese Patent Laid-Open Publication 52/80099, suggests staggering the times that power is supplied to the loads.

Japanese Utility Model Publication 55/8056 suggests providing the heater for boiling water with a phase control circuit, and regulating the heater current by the phase control circuit.

Japanese Patent Laid-Open Publication 59/231694 suggests detecting the input current of the vending machine, and controlling the heater current in relation to a change of the input current.

However, with the prior art methods of staggering the load and providing a phase control circuit, effective use of the heater cannot be achieved because of the length of time required to heat the water to a predetermined temperature in order to obtain adequately hot water.

With the prior art method of detecting the input current, since power is supplied to the heater even when the compressor is started, the power is reduced due to the line drop so that it takes a long time to start the compressor. Further, since all of the input current, having been phase controlled, is necessarily detected, the amount of the detected current would be unstable.

SUMMARY OF THE INVENTION

It is an object of the present invention to provide a heater current control method for an automatic vending machine in which a heater for boiling water is used effectively so that hot water of a desired temperature can be served at any time.

An automatic vending machine according to the present invention has a heater for boiling water and a motor-driven compressor for refrigeration. The flow of current to the heater is terminated while the compressor is being started, and while the compressor is being operated stably, the current flowing in the heater is phase controlled such that the sum of the effective current flowing in the compressor and the effective current flowing in the heater does not exceed a predetermined value.

Further objects, features and aspects of this invention will be understood from the detailed description of the preferred embodiment of this invention while referring to the annexed drawings.

DETAILED DESCRIPTION OF THE DRAWINGS

Figure 1:
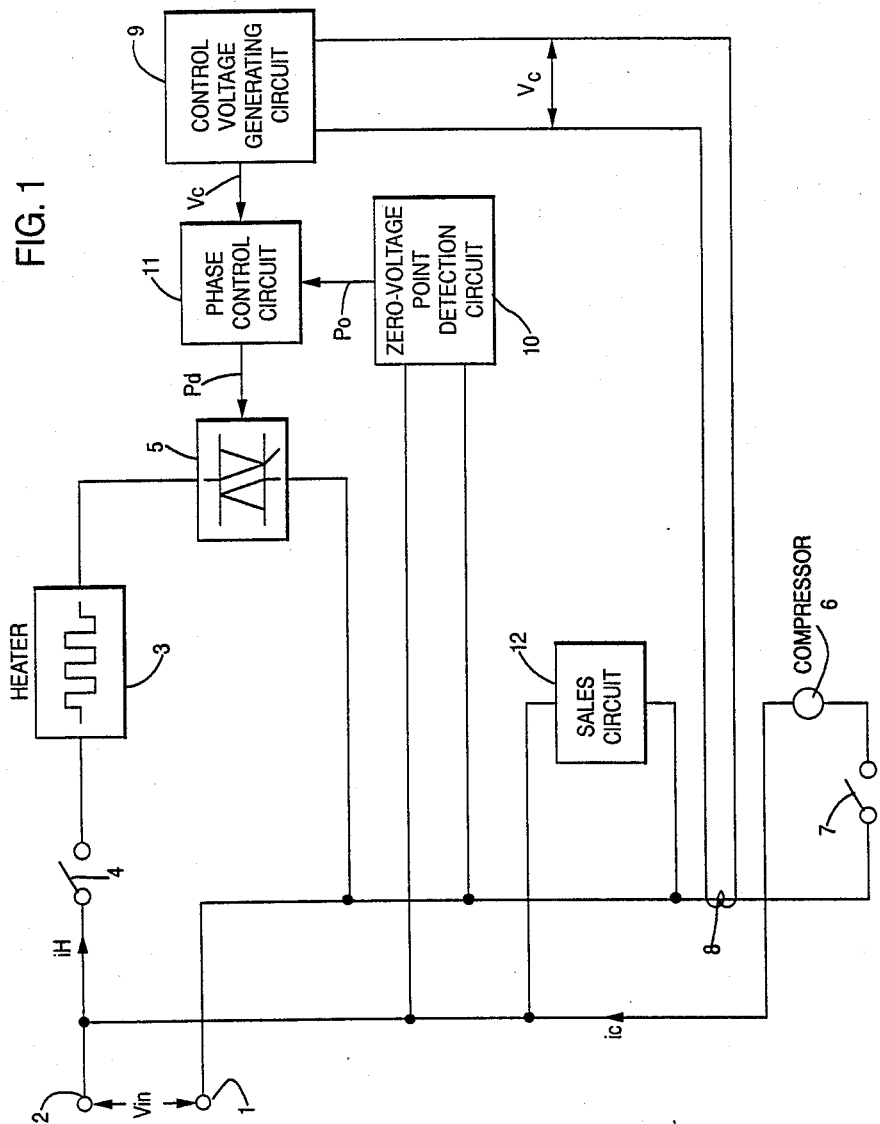
FIG. 1 is a block diagram showing an embodiment of a heater current control appartus for carrying out the method of the present invention.

FIG. 1 is a block diagram showing an embodiment of a heater current control apparatus for carrying out the method of the present invention. In the illustrated embodiment, the heater current controls apparatus is applied to an automatic coffee vending machine which includes a heater for boiling water, and a motor-drive compressor for refrigeration.

In FIG. 1, reference numerals 1 and 2 designate input terminals to which a power source of 100 volts a.c. is to be connected. Designated by reference numeral 3 is a heater, for boiling water, which is connected to terminal 2 via a switch 4 for energizing the heater 3 and to terminal 1 via a bi-directional three-terminal thyristor 5. Reference numeral 6 designates a motor-driven compressor, for providing refrigeration, which is connected to the input terminal 1 via a switch 7 for energizing the compressor 6 and also connected to input terminal 2. Reference numeral 8 designates a detector for detecting a current $i_c$ flowing in the compressor 6 and for outputting a detection voltage $v_c$ proportional to the detected current $i_c$. Reference numeral 9 designates a control voltage generating circuit for generating a control voltage $V_c$ (described below) commensurate with the detection voltage $v_c$ outputted by the detector 8. Reference numeral 10 designates a zero-voltage point detection circuit for detecting a zero-voltage point of the 100 volt a.c. voltage supplied from the input terminals 1, 2 and for outputting a zero cross pulse Po. Reference numeral 11 designates a phase control circuit which is adapted to be set by the zero cross pulse Po output from the zero-voltage point detection circuit 10 and which outputs a drive pulse Pd to a gate terminal of the bi-directional three-terminal thyristor 5, after a time delay $\tau c$, from the time when the zero cross pulse Po is input, the time delay $\tau c$ being proportional to the control voltage $V_c$ output from control voltage generating circuit 9. Reference numeral 12 designates a sales circuit connected between the input terminals 1, 2.

When the detection voltage $v_c$ operated by the current detector 8 varies sharply, i.e., if the absolute value of the variation coefficient $dIc/dt$ of the effective value $I_c$ of the current $i_c$ flowing in the compressor 6 is large, the control voltage generating circuit 9 produces, as the control voltage $V_c$, a voltage Vt larger than the voltage Vo (Vt>Vo). The voltage Vo corresponds to the period To of the zero cross pulse Po. The effective current value $I_c$ is represented by the following equation;

$$I_c = \sqrt{\frac{1}{T_o} \int_{t-T_o}^{t} (i_c)^2 \, dt}$$

On the other hand, when the detection voltage $v_c$ from the current detector 8 is stable, i.e., if the absolute value of the variation coefficient $dIc/dt$ is small, the control voltage generating circuit 9 produces, as the control voltage $V_c$, a voltage proportional to the effective value of the detection voltage $v_c$.

Figure 2:
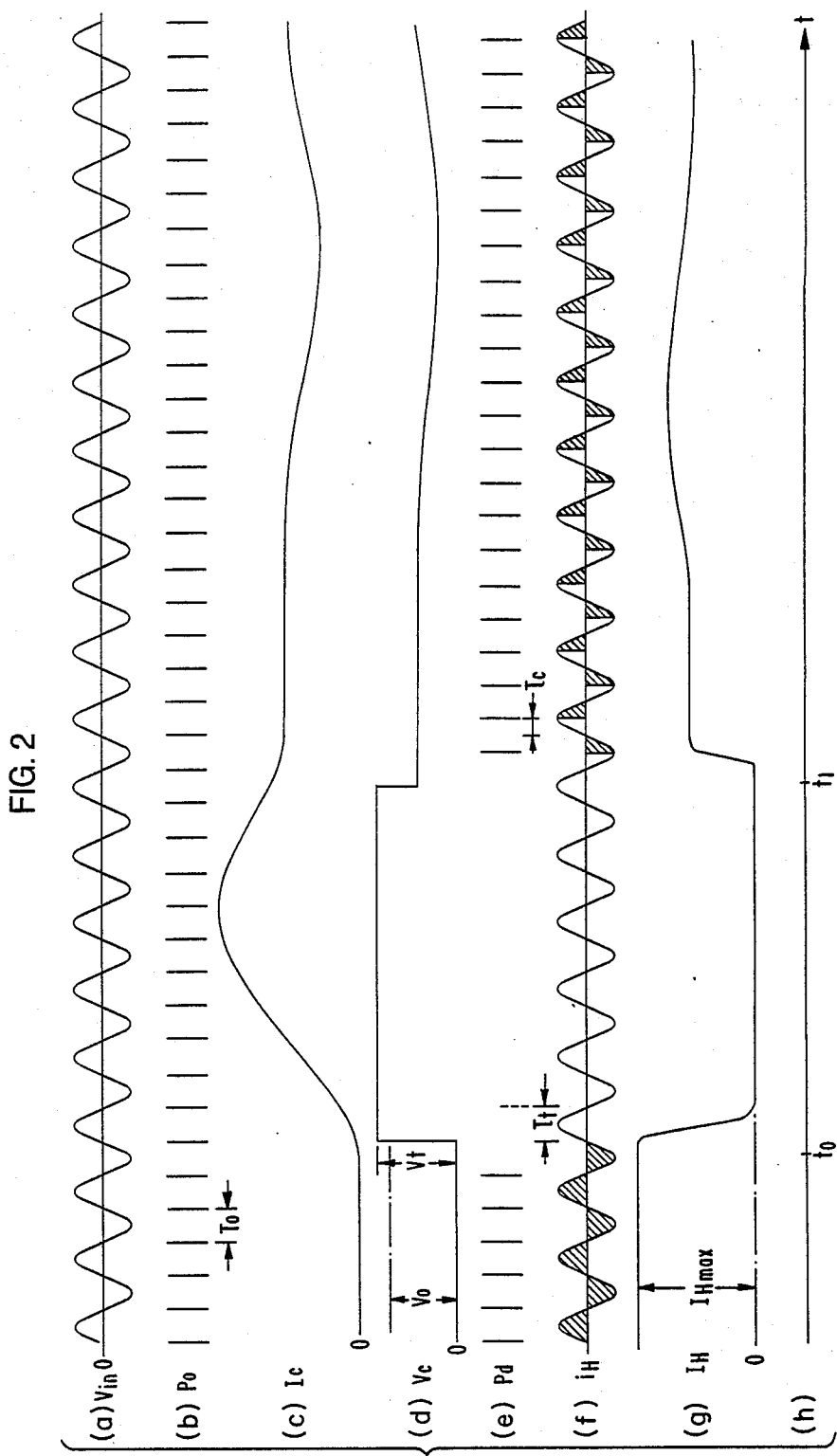
FIGS. 2 a–h are time charts illustrating the operation of the apparatus of FIG. 1.

The mode of operation of the heater current control apparatus will now be described with reference to the time charts of FIG. 2. It should be noted that the switch 4 for energizing the heater 3 is maintained in the on position throughout the description of operation.

Initially, the switch 7 for energizing the compressor 6 is in the OFF position. In this condition, because the detection voltage $v_c$ from the current detector 8 is zero, the control voltage generating circuit 9 produces a zero voltage as the control voltage $V_c$ ($V_c=0$ volts) FIG. 2d. As seen in FIG. 2e, the phase control circuit 11 outputs a drive pulse Pd immediately (delayed time $\tau c=0$ seconds) after having been reset by the zero cross pulse Po output from the zero-voltage point detection circuit 10. Accordingly, the voltage $V_{in}$ (FIG. 2a) from the input terminals 1, 2 is supplied to the heater 3, virtually without change, whereupon a current $i_H$ flows, as shown by the cross-hatched lines in FIG. 2f. As a result, the maximum current $I_{H max}$ flows as the effective value $I_H$ of the current flowing in the heater 3 (FIG. 2g; t<to). This effective current value $I_H$ is represented by the following equation:

$$I_H = \sqrt{\frac{1}{T_o} \int_{t-T_o}^{t} (i_H)^2 \, dt}$$

In this initial condition, if the switch 7 for the compressor 6 is operated to be in the ON position at a time $t_o$, the effective current value $I_c$ varies sharply as shown in FIG. 2c, that is, a transient current larger than $dI_c/dt$ flows in the compressor 6. Pursuant to this, since the detection voltage $v_c$ from the current detector 8 also varies sharply, the control voltage generating circuit 9 produces the above-mentioned voltage $V_t$ as the control voltage $V_c$ (FIG. 2d). As discussed above, because the delayed time $\tau_t$, proportional to this voltage Vt, is longer than the period $T_o$ of the zero cross pulse $P_o$, the phase control circuit 11 does not input a drive pulse Pd to the gate terminal of the bi-directional three-terminal thyristor 5. Since the bi-directional three-terminal thyristor 5 is thus maintained in the OFF position, the A.C. voltage $V_{in}$ is not supplied to the heater 3. As a result, the current $i_H$ does not flow so that the effective current value $I_H$ becomes zero ($I_H=0$ amperes) (FIG. 2g; $t_o<t<t_1$).

Then, when the current $i_c$ flowing in the compressor 6 becomes stable, i.e., if the absolute value of $dI_c/dt$ becomes small, the detection voltage $v_c$ from the current detector 8 also becomes stable so that the control voltage generating circuit 9 produces, as the control voltage $V_c$, a control voltage proportional to the effective value of the detection voltage $v_c$. Therefore, the phase control circuit 11 outputs a drive pulse Pd to the gate terminal of the bi-directional three-terminal thyristor 5 after a time delay of $\tau_c$ from the time the phase control circuit was reset by the zero cross pulse Po, the delayed time $\tau_c$ being proportional to the control voltage $V_c$. Consequently, the A.C. voltage $V_{in}$ is being supplied to the heater 3 from the time the drive pulse Pd is sent out until the time the A.C. voltage $V_{in}$ becomes zero volts, during which time the current $i_H$ flows in the heater as shown by the cross-hatched lines in FIG. 2f.

Accordingly, thereafter, the heater current $i_H$ is phase controlled such that the sum of the effective current $I_c$ flowing in the compressor 6 and the effective current flowing in the heater 3 is less than a predetermined value. The phase controlled current $i_H$ then flows in the heater 3 (FIG. 2g; $t>t_1$).

In the foregoing embodiment, the control voltage generating circuit 9 controls the control voltage $V_c$ to be produced, based on the variation coefficient $dI_c/dt$ of the effective current $I_c$ flowing in the compressor 6. Alternatively, the control voltage generating circuit 9 may produce, as the control voltage $V_c$, a Voltage $V_t$, when the current $i_c$ flows in the compressor 6, such that this voltage $V_t$ is generated during a transient time of the compressor 6 and such that a voltage proportional to the effective current $I_c$ flowing in the compressor 6 is generated after the transient time as seen in FIG. 2d.

The method of the present invention is advantageous in that since the current flow to the heater for boiling water is stopped when the compressor for refrigeration is started, it is possible to start the compressor in a short time. Further, while the compressor is being operated stably, the current flowing in the heater is phase controlled such that the sum of the effective current consumed in the compressor and the effective current consumed in the heater does not exceed a predetermined value. Accordingly, hot water of a desired temperature can be served at any time, thus resulting in an effective use of the heater.

This invention has been described in detail in connection with the preferred embodiment, but this embodiment is by way of example only and is not to be considered as restricted thereto. It will be easily understood by those skilled in the art that other variations and modifications can be easily made within the scope of the invention as claimed.

What is claimed:

1. A method for controlling a heater current in an automatic vending machine including a heater, and a motor-driven compressor for refrigeration, characterized by:
    detecting an amount of current flowing in said compressor;
    determining when said compressor is being started, based on the amount of detected current flowing in said compressor;
    terminating a flow of current to said heater when an effective value of the detected current flowing in said compressor exceeds a predetermined value; and
    phase controlling the current flowing in said heater when said compressor is being operated stably, such that the sum of an effective current flowing in said compressor and an effective current flowing in said heater does not exceed a predetermined value.

2. An apparatus for controlling a heater current in an automatic vending machine including a heater and a motor driven compressor for refrigeration, comprising:
    means for detecting the amount of current flowing in said compressor;
    means for determining when said compressor is being started based on the amount of detected current flowing in said compressor;
    means for terminating a flow of current to said heater when the amount of current flowing in said compressor exceeds a predetermined amount; and
    means for phase controlling the current flowing in said heater when said compressor is being operated stably such that the sum of an effective current flowing in said compressor and an effective current flowing in said heater does not exceed a predetermined value.

* * * * *